United States Patent
Sakai

(10) Patent No.: US 11,455,413 B2
(45) Date of Patent: Sep. 27, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Yutaka Sakai, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 112 days.

(21) Appl. No.: 16/848,265

(22) Filed: Apr. 14, 2020

(65) Prior Publication Data
US 2021/0165900 A1 Jun. 3, 2021

(30) Foreign Application Priority Data
Dec. 2, 2019 (JP) .............................. JP2019-218007

(51) Int. Cl.
G06F 21/62 (2013.01)
G06F 21/31 (2013.01)
(Continued)

(52) U.S. Cl.
CPC .......... G06F 21/6218 (2013.01); G06F 21/31 (2013.01); G06F 21/45 (2013.01);
(Continued)

(58) Field of Classification Search
CPC .......... G06F 21/45; G06F 21/31; G06F 21/78; G06F 21/6218; G06F 2221/2141; H04L 63/0884
See application file for complete search history.

(56) References Cited

U.S. PATENT DOCUMENTS 9,071,605 B2   6/2015  Ishino
9,130,935 B2 * 9/2015  Somani ............... H04L 63/0815
(Continued)

FOREIGN PATENT DOCUMENTS

JP        2014-10769 A      1/2014

OTHER PUBLICATIONS

WeiYi Liu, Yue Tan and Enwei Zhang, "Service token for identity access management," 2009 IEEE Asia-Pacific Services Computing Conference (APSCC), 2009, pp. 34-39. (Year: 2009).*
(Continued)

Primary Examiner — Kari L Schmidt
(74) Attorney, Agent, or Firm — Oliff PLC

(57) ABSTRACT

An information processing apparatus includes a processor configured to: obtain first authority information indicating possession of authority over a server, the first authority information being associated with user's identification information, and second authority information indicating possession of authority over the server that is different from authority indicated by the first authority information; accept a request for the server; in a case where the request is executable with authority based on the first authority information identified by the identification information, add the first authority information to the request and send the request with the first authority information to the server; and in a case where the request is not executable with authority based on the first authority information and is executable with authority based on the second authority information, add the second authority information to the request and send the request with the second authority information to the server.

14 Claims, 5 Drawing Sheets

(51) Int. Cl.
*G06F 21/78* (2013.01)
*H04L 9/40* (2022.01)
*G06F 21/45* (2013.01)

(52) U.S. Cl.
CPC .......... *G06F 21/78* (2013.01); *H04L 63/0884* (2013.01); *G06F 2221/0711* (2013.01); *G06F 2221/2141* (2013.01)

(56) References Cited

U.S. PATENT DOCUMENTS

| | | | | |
|---|---|---|---|---|
| 9,461,996 | B2* | 10/2016 | Hayton | G06F 21/31 |
| 9,509,692 | B2* | 11/2016 | Innes | H04L 63/0884 |
| 9,548,982 | B1* | 1/2017 | Karunakaran | H04W 12/08 |
| 9,560,026 | B1* | 1/2017 | Worsley | H04L 63/107 |
| 10,783,235 | B1* | 9/2020 | Agarwal | G06F 21/44 |
| 2002/0091757 | A1* | 7/2002 | Cuomo | H04L 67/28 709/203 |
| 2005/0015490 | A1* | 1/2005 | Saare | H04L 63/083 709/225 |
| 2005/0021975 | A1* | 1/2005 | Liu | H04L 63/0823 713/182 |
| 2006/0005237 | A1* | 1/2006 | Kobata | H04L 63/123 726/12 |
| 2006/0053300 | A1* | 3/2006 | Noguchi | H04L 63/0884 713/182 |
| 2006/0248585 | A1* | 11/2006 | Ward | G06F 21/6218 726/20 |
| 2006/0294192 | A1* | 12/2006 | Mao | H04L 63/102 709/213 |
| 2007/0006291 | A1* | 1/2007 | Barari | H04L 63/0884 726/10 |
| 2008/0134305 | A1* | 6/2008 | Hinton | H04L 63/08 726/5 |
| 2009/0094684 | A1* | 4/2009 | Chinnusamy | H04L 63/0281 726/4 |
| 2010/0235882 | A1* | 9/2010 | Moore | H04L 63/0807 726/3 |
| 2010/0325441 | A1* | 12/2010 | Laurie | H04L 9/3257 713/185 |
| 2012/0227098 | A1* | 9/2012 | Obasanjo | H04L 63/0807 726/8 |
| 2012/0260333 | A1* | 10/2012 | Uchikawa | H04N 1/4413 726/17 |
| 2013/0152169 | A1* | 6/2013 | Stuntebeck | H04L 67/16 726/4 |
| 2013/0225081 | A1* | 8/2013 | Doss | G06K 7/10 455/41.2 |
| 2014/0109209 | A1* | 4/2014 | Haynes | H04L 63/08 726/7 |
| 2014/0373093 | A1* | 12/2014 | Wood | H04L 63/08 726/3 |
| 2015/0135257 | A1* | 5/2015 | Shah | G06F 21/6218 726/1 |
| 2017/0126689 | A1* | 5/2017 | Lloyd | H04L 61/1594 |
| 2020/0120104 | A1* | 4/2020 | Lu | H04L 63/0884 |
| 2021/0051137 | A1* | 2/2021 | Ruiz | H04L 9/0894 |
| 2021/0136084 | A1* | 5/2021 | Dayan | H04L 63/105 |
| 2021/0144138 | A1* | 5/2021 | Kishimoto | H04L 67/42 |
| 2021/0158315 | A1* | 5/2021 | Phillips | G06Q 20/1085 |

OTHER PUBLICATIONS

S. A. Almulla and Chan Yeob Yeun, "Cloud computing security management," 2010 Second International Conference on Engineering System Management and Applications, 2010, pp. 1-7. (Year: 2010).*

Y. Yang, X. Chen, G. Wang and L. Cao, "An Identity and Access Management Architecture in Cloud," 2014 Seventh International Symposium on Computational Intelligence and Design, 2014, pp. 200-203. (Year: 2014).*

* cited by examiner

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-218007 filed Dec. 2, 2019.

BACKGROUND

(i) Technical Field

The present disclosure relates to an information processing apparatus and a non-transitory computer readable medium.

(ii) Related Art

As a method of controlling access to a server, a control method using an access token issued by the server side is available.

Japanese Unexamined Patent Application Publication No. 2014-10769 discloses a relay apparatus that obtains, from a service providing apparatus, user identification information and an access token (authority information) indicating the possession of authority to access the service providing apparatus, stores the user identification information and the access token in association with each other, and, on receipt of data including user identification information, adds an access token stored in association with the user identification information to the data and sends the data with the access token to the service providing apparatus.

If a server at the destination of access based on an access token is changed by, for example, updating its version or adding a new function, which gives rise to a function or a service unusable with an existing access token, it is very bothersome to reacquire an access token for each user in order to use the function or the service.

SUMMARY

Aspects of non-limiting embodiments of the present disclosure relate to providing means for using, even if a server at the destination of access is changed, a function or a service of the server after the change without reacquiring an access token for each user.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: obtain first authority information indicating possession of authority over a server, the first authority information being associated with user's identification information, and second authority information indicating possession of authority over the server that is different from authority indicated by the first authority information; accept a request for the server; in a case where the request is executable with authority based on the first authority information identified by the identification information, add the first authority information to the request and send the request with the first authority information to the server; and in a case where the request is not executable with authority based on the first authority information and is executable with authority based on the second authority information, add the second authority information to the request and send the request with the second authority information to the server.

BRIEF DESCRIPTION OF THE DRAWINGS

An exemplary embodiment of the present disclosure will be described in detail based on the following figures, wherein:

FIG. 6A is a diagram illustrating that only services usable with a normal token are displayed, and FIG. 6B is a diagram illustrating that services usable with a normal token and a special token are displayed.

DETAILED DESCRIPTION

Hereinafter, an exemplary embodiment of the present disclosure will be described in detail with reference to the accompanying drawings.

System Configuration

Figure 1:
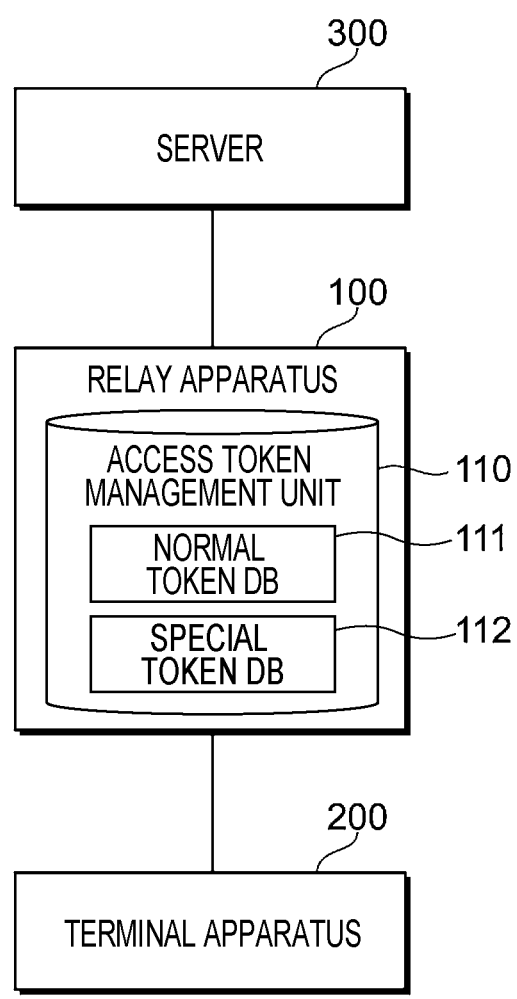
FIG. 1 is a diagram illustrating the overall configuration of an information processing system to which an exemplary embodiment is applied.

FIG. 1 is a diagram illustrating the overall configuration of an information processing system to which the exemplary embodiment is applied. The information processing system according to the present exemplary embodiment includes a relay apparatus 100, a terminal apparatus 200, and a server 300. The relay apparatus 100 and the terminal apparatus 200, and the relay apparatus 100 and the server 300 are connected to each other via, for example, a network. Although FIG. 1 illustrates one terminal apparatus 200, a plurality of terminal apparatuses 200 may be connected to the relay apparatus 100.

The relay apparatus 100 accepts an execution request from the terminal apparatus 200, adds an access token to the accepted execution request, and sends the execution request with the access token to the server 300. An access token is authority information indicating authority over the server 300, and is authentication information that identifies an authorized subject. In the present exemplary embodiment, normal tokens and special tokens are used as access tokens. These access tokens will be described in detail later.

The relay apparatus 100 includes an access token management unit 110 for holding and managing access tokens. The access token management unit 110 is provided with a storage device such as a solid state drive (SSD) or a magnetic disk device (hard disk drive (HDD)). In addition, the access token management unit 110 is provided with a normal token database (DB) 111 for registering and managing normal tokens, and a special token DB 112 for registering and managing special tokens.

The terminal apparatus 200 selects a service to use from among services provided by functions of the server 300, and outputs an execution request. Selection of a service is performed using, for example, a user interface (UI) screen obtained from the relay apparatus 100.

In response to an execution request received along with an access token, the server 300 executes a process according to a service selected by the execution request. In addition, the server 300 sets authority to use a service based on its function, and issues an access token which is authority information indicating this authority. In the present exemplary embodiment, it is assumed that the server 300 is capable of restricting, regarding set authority, the use of each of services usable with the authority based on an access token indicating the authority.

As an example of the information processing system, a system is conceived in which an image processing apparatus that reads (scans) a document image is assumed as the terminal apparatus 200, and the server 300 provides a service of registering and managing receipt data and expenses. For example, the image processing apparatus, which is the terminal apparatus 200, scans a receipt, and sends data of the scanned receipt along with an execution command for executing a registration process to the server 300 via the relay apparatus 100. At this time, the relay apparatus 100 adds an access token indicating the possession of authority to use the service of the server 300 to the execution command for executing a registration process. In accordance with the execution command received along with the access token, the server 300 registers and manages the receipt data.

Configuration of Relay Apparatus 100

Figure 2:
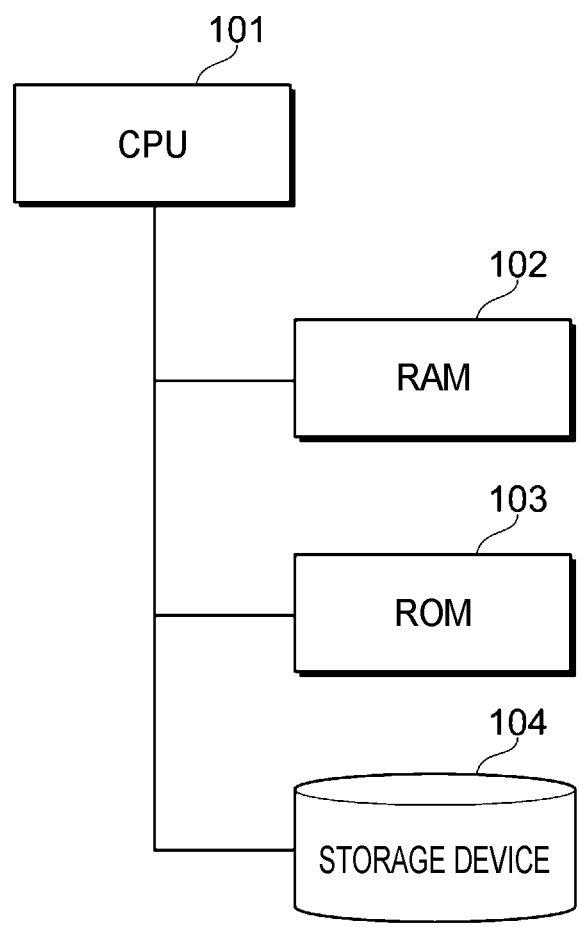
FIG. 2 is a diagram illustrating an example of the hardware configuration of a relay apparatus.

FIG. 2 is a diagram illustrating an example of the hardware configuration of the relay apparatus 100. The relay apparatus 100 is realized by a computer. The computer realizing the relay apparatus 100 includes a central processing unit (CPU) 101, which is an arithmetic processing unit, and random-access memory (RAM) 102, read-only memory (ROM) 103, and a storage device 104, which are storage units. The RAM 102 is a main storage device (main memory), and is used as a work memory when the CPU 101 performs arithmetic processing. The ROM 103 stores programs and data such as prepared setting values. The CPU 101 may directly load programs and data from the ROM 103 and execute processing. The storage device 104 is a unit for storing programs and data. The storage device 104 stores a program. The CPU 101 loads the program stored in the storage device 104 to the RAM 102, which is a main storage device, and executes the program. In addition, the storage device 104 stores and saves the result of processing performed by the CPU 101. As the storage device 104, for example, a magnetic disk device or a solid state drive (SSD) is used.

The relay apparatus 100 realizes, for example, a function of relaying an execution request from the terminal apparatus 200 to the server 300 and controlling access to the server 300 based on an access token by executing a program by the CPU 101. Specifically, the relay apparatus 100 adds an access token in accordance with a user of the terminal apparatus 200 and a selected function to an execution request for the server 300, which is accepted from the terminal apparatus 200. The relay apparatus 100 sends the execution request to which the access token is added to the server 300.

The CPU 101 manages an access token by using an access token management function realized by executing the program. As illustrated in FIG. 1, the relay apparatus 100 includes the access token management unit 110, and the access token management unit 110 is provided with the normal token DB 111 and the special token DB 112.

Here, normal tokens and special tokens will be described. A normal token is an access token individually set to each user using a service of the server 300. A normal token is individually associated with identification information of a user who is an authorized subject. Therefore, a normal token authenticates a user identified by corresponding identification information, and indicates authority set to this user. A normal token is an example of first authority information, and authority indicated by a normal token is an example of first authority.

A special token is a token to which authority different from that of a normal token is set. Authority different from that of a normal token means that the range of authority differs from that of a normal token. For example, stronger authority than that of a normal token is set to a special token. Here, strong authority includes the entire range of authority identified by a normal token (authority based on a normal token), and further extends beyond the range of a normal token toward a set range. In addition, a special token may be, for example, mainly obtained by an organization such as a company, and may be set as a token usable by users belonging to the organization. In this way, for example, in the case where an organization to which the user of a normal token belongs obtains a special token, the user of the normal token may gain access based on his/her normal token as well as the special token of the organization to whish he/she belongs. A special token is an example of second authority information, and authority indicated by a special token is an example of second authority.

Figure 4:
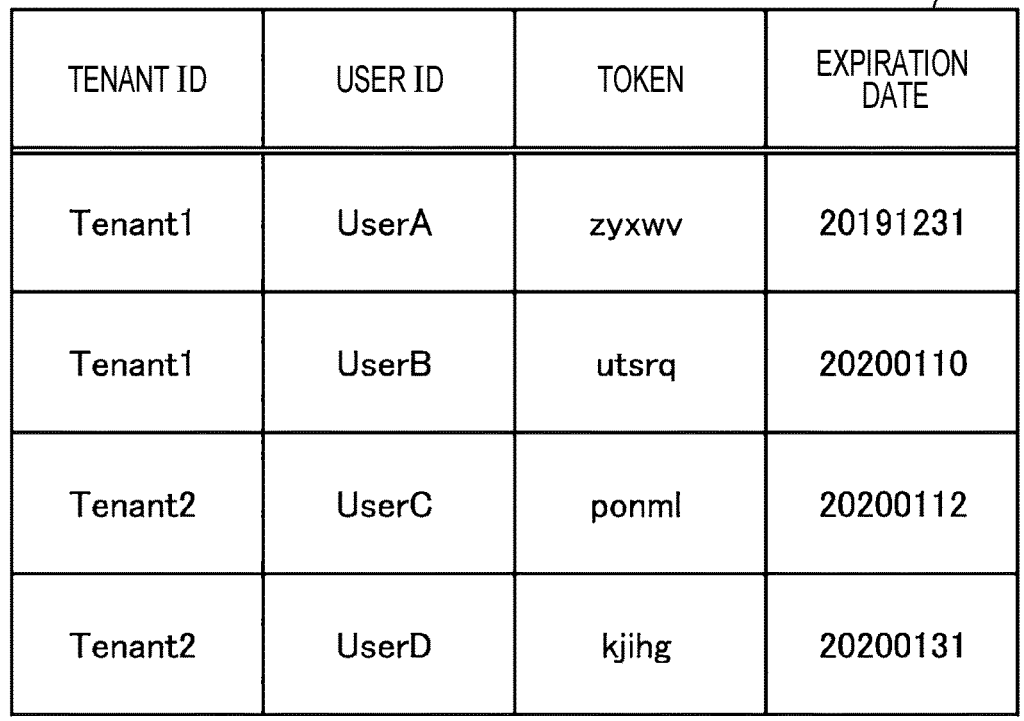
FIG. 4 is a diagram illustrating an example of the configuration of a normal token database (DB)

FIG. 4 is a diagram illustrating an example of the configuration of the normal token DB 111. In the example illustrated in FIG. 4, the items "tenant ID", "user ID", "token", and "expiration date" are registered for each set normal token. "Tenant ID" is identification information of a tenant to which a user belongs. A tenant is a unit of a target to which authority over the server 300 is set. That is, the authority to use a function of the server 300 is set to each tenant. Each user belongs to any tenant, and authority over the server 300 is assigned under control of the tenant. In the present exemplary embodiment, a tenant corresponds to an organization to which a user belongs. "User ID" is identification information of a user. "Token" is identification information of an issued normal token. As described above, authority over the server 300 is set in units of tenants, and each user is assigned authority by a tenant to which he/she belongs. A normal token indicating each user's authority is issued for each user by the server 300. "Expiration date" indicates the expiration date of an issued normal token.

Figure 5:
FIG. 5 is a diagram illustrating an example of the configuration of a special token DB.

FIG. 5 is a diagram illustrating an example of the configuration of the special token DB 112. In the example illustrated in FIG. 5, the items "tenant ID", "token", and "expiration date" are registered for each set special token. "Tenant ID" is identification information of a tenant to which authority over the server 300 is set. As described above, in the present exemplary embodiment, a tenant corresponds to an organization to which a user belongs. Therefore, "tenant ID" is identification information of an organization corresponding to each tenant. "Token" is identification information of an issued special token. A special token is issued to an organization identified by "tenant ID". Accordingly, for example, a user with the user ID "UserA"

who belongs to an organization identified by the tenant ID "Tenant 1" is allowed to use a service of the server 300 based on his/her normal token "zyxwv" and the special token "abcde" of the organization to which he/she belongs. "Expiration date" indicates the expiration date of an issued special token.

Note that holding and management of access tokens may be performed by a database server provided separately from the relay apparatus 100. In this case, the normal token DB 111 and the special token DB 112 are provided in the database server. The CPU 101 of the relay apparatus 100 identifies a necessary access token on the basis of an execution request accepted from the terminal apparatus 200, and obtains the access token from the database server.

Returning to a function of the relay apparatus 100, the CPU 101 obtains user's identification information by using identification information obtaining function realized by executing the program. The CPU 101 may obtain user's identification information in order for the relay apparatus 100 itself to authenticate the user, or may receive authentication information obtained by user authentication performed by the terminal apparatus 200 from the terminal apparatus 200, and use the obtained information as identification information. In addition, the CPU 101 may obtain identification information from an external apparatus other than the terminal apparatus 200. With this identification information, a normal token associated with the identification information is identified, and a special token of an organization to which the user according to the identification information belongs is identified.

In addition, the CPU 101 inquires of the server 300 whether, out of a normal token and a special token identified on the basis of the user's identification information, authority based on at least the special token is valid, by using an authority inquiry function realized by executing the program. More specifically, the CPU 101 inquires whether the individual services of the server 300 usable with authority identified by a special token (authority based on a special token) are usable. The server 300 may restrict the use of its services based on the individual access tokens. It is thus necessary to confirm whether a service is usable with the identified special token. Although an inquiry about the validity of authority based on a special token that is not set by the user himself/herself is made here, an inquiry about the validity of authority based on a normal token may also be made. An inquiry about authority (whether a service is usable) is made, for example, before the user selects a service to use. Therefore, an inquiry to the server 300 is made before accepting an execution request from the terminal apparatus 200. Specifically, for example, because a normal token and a special token usable by the user are identified when identification information is obtained, an inquiry may be made at this time point.

In addition, the CPU 101 generates a UI screen, sends the UI screen to the terminal apparatus 200 to display the UI screen on the display device, and accepts a command based on a user operation performed on the UI screen, by using a command accepting function realized by executing the program. A command to be accepted includes an execution request for a to-be-used service of the server 300. Here, as a result of an inquiry to the server 300, an execution request for a service unusable either based on a normal token or a special token is not accepted. Restrictions are sometimes individually set to authority identified by a normal token. In this case, for a service that is not usable due to the restriction of authority, even if the service is executable with authority identified by a special token, an execution request for the service is not accepted. Note that the UI screen displayed on the terminal apparatus 200 will be described later.

In addition, the CPU 101 selects an access token used to allow the server 300 to execute a service according to an execution request accepted from the terminal apparatus 200 by using an access-token-to-be-used selecting function realized by executing the program. Specifically, a normal token is selected as an access token used for an execution request for a service usable with authority identified by a normal token. A special token is selected as an access token used for an execution request for a service that is unusable with authority identified by a normal token but is usable only with authority identified by a special token. That is, a normal token is selected as an access token used for an execution request for a service that is usable with both authority identified by a normal token and authority identified by a special token.

In addition, the CPU 101 adds the selected access token (normal token or special token) to an execution request accepted from the terminal apparatus 200 and sends the execution request with the access token to the server 300 by using a sending function realized by executing the program.

Configuration of Terminal Apparatus 200

Figure 3:
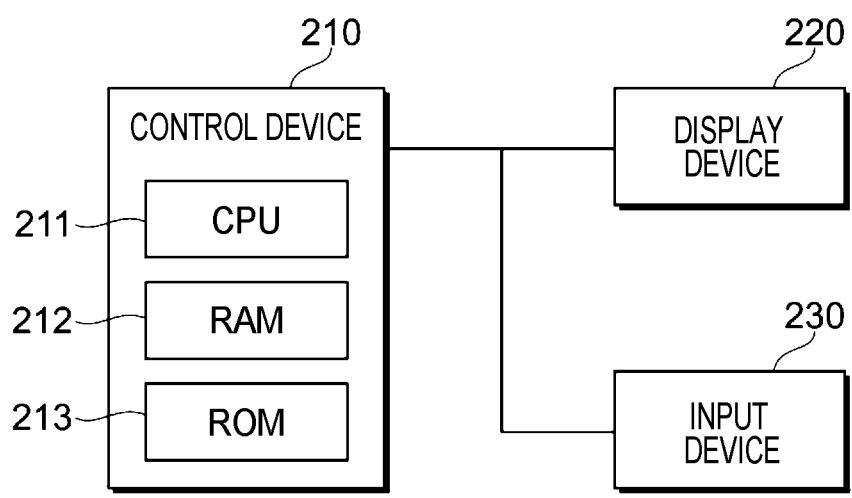
FIG. 3 is a diagram illustrating an example of the hardware configuration of a terminal apparatus.

FIG. 3 is a diagram illustrating an example of the hardware configuration of the terminal apparatus 200. The terminal apparatus 200 includes a control device 210, a display device 220, and an input device 230. The terminal apparatus 200 is realized by, for example, an information processing apparatus such as a personal computer. The configuration illustrated in FIG. 3 is only exemplary, and the configuration of the terminal apparatus 200 is not restricted to the illustrated configuration. For example, the configuration may include a storage device that holds various types of data used for processing and the processing results, and peripheral devices realizing various functions under control of the control device 210. As an example, an image processing apparatus including a computer as the control device 210, an image reading device, and an image forming device may be used as the terminal apparatus 200.

The control device 210 is a device that controls the terminal apparatus 200, and includes a CPU 211, RAM 212, and ROM 213. The RAM 212 is a main storage device and is used as a work memory when the CPU 211 performs arithmetic processing. The ROM 213 stores programs and data such as prepared setting values. The CPU 211 loads programs and data from the ROM 213 and executes processing.

The display device 220 is a device that displays a screen such as an operation screen or an information presenting screen. The display device 220 displays a UI screen obtained from the relay apparatus 100. As the display device 220, for example, a liquid crystal display or the like is used.

The input device 230 is a device that accepts an input operation performed by a user. The input device 230 accepts an operation performed by a user in accordance with an operation screen such as a UI screen displayed on the display device 220. As the input device 230, for example, devices such as a keyboard and a mouse are used. In addition, a touch sensor may be used as the input device 230 and combined with a liquid crystal display, which is the display device 220, to constitute a touchscreen serving as a user interface.

Example of Configuration of UI Screen

Figure 6A:
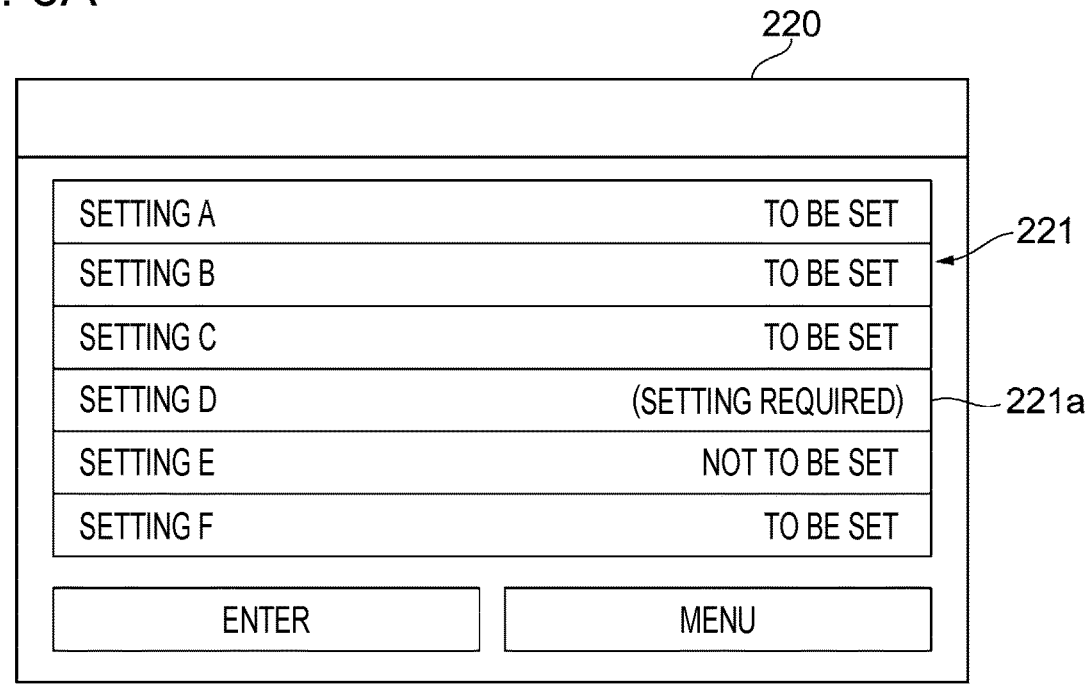
FIGS. 6A and 6B are diagrams illustrating examples of the configuration of a user interface (UI) screen displayed on a display device of the terminal apparatus, namely.
Figure 6B:
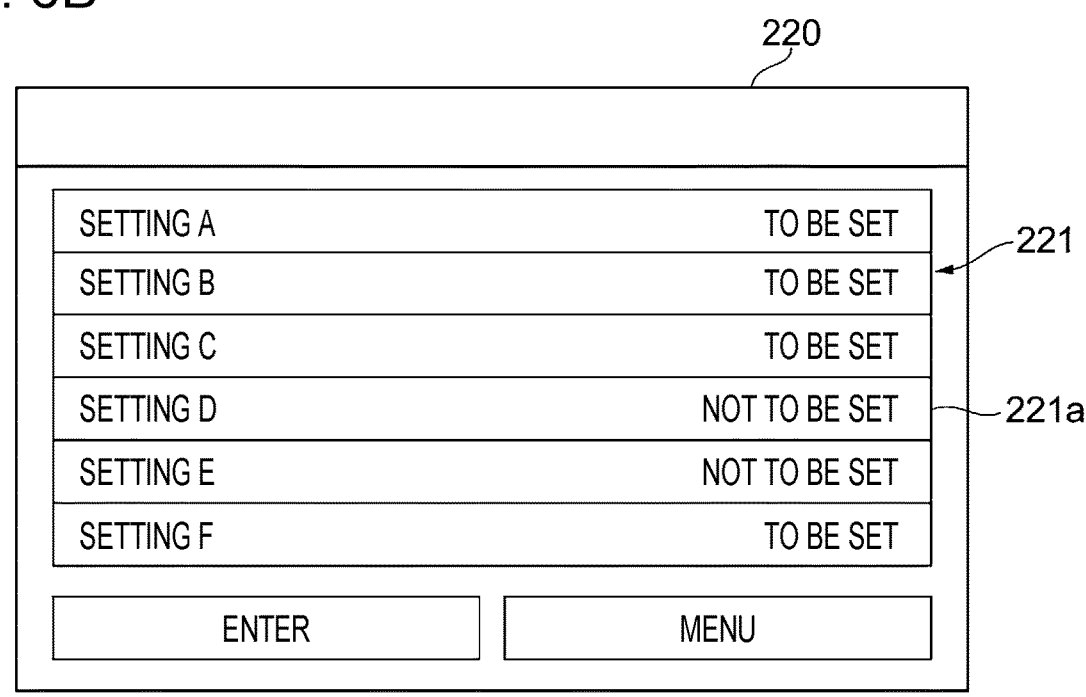

FIGS. 6A and 6B are diagrams illustrating examples of the configuration of a UI screen displayed on the display device 220 of the terminal apparatus 200. FIG. 6A is a diagram illustrating that only services usable with a normal token are displayed, and FIG. 6B is a diagram illustrating that services usable with a normal token and a special token are displayed.

As described above, in the case where a special token is set to a tenant corresponding to an organization to which a user belongs, if a service unusable with authority identified by the user's normal token is usable with authority identified by the special token, the user is allowed to use the service. In contrast, in the case where no special token is set to a tenant corresponding to an organization to which a user belongs or the user is not allowed to use a special token, the user is only allowed to use a service usable with authority identified by the user's own normal token.

In other words, even in the case where the server 300 is changed by, for example, updating its version or adding a new function, which sets a service unusable with authority identified by a normal token used by each user until then, if the service is a service usable with authority identified by a special token, the user is allowed to use the new service without updating his/her normal token. Sometimes, a new service may be initially unusable even with authority identified by a special token. In such a case, it is necessary to support a new service by updating a special token. However, because a special token is updated by an organization which is a tenant, the user is not bothered. If one special token is updated, the updated special token is allowed to be used by each user belonging to an organization which is a tenant to which the special token is set. Thus, the updating task may be alleviated, compared with the case in which each user individually updates his/her normal token.

The UI screen illustrated in FIGS. 6A and 6B displays a list 221 of services selectable by a user. Here, it is assumed that a function of accepting selection of whether to set each of settings A to F, and, if each setting is to be set, accepting the setting details is provided as a service. From comparison of FIG. 6A in which only services usable with a normal token are displayed and FIG. 6B in which services usable with a normal token and a special token are displayed, how an item 221*a* is displayed is different. It is assumed that whether to set the item 221*a* is selectable in the case of authority identified by a special token, but setting of the item 221*a* is required in the case of authority identified by a normal token. In the example illustrated in FIG. 6A, the item 221*a* is displayed as "(setting required)", and whether to create a report is not selectable. In contrast, in the example illustrated in FIG. 6B, the item 221*a* is displayed as "not to be set", which indicates that the service that setting by the user is not performed has been selected.

On the UI screen, services usable with a normal token and services usable with a special token are displayed without distinction. Specifically, how the list 221 is displayed, as in FIGS. 6A and 6B, is not different between the case where a certain service is usable with a normal token and the case where a certain service is unusable with a normal token but is usable with a special token. Therefore, even if the number of services usable with a special token increases, the user simply sees this as an increase in the number of usable services, and the user may select a service without paying attention to whether each service is a service usable with a normal token or a service usable with a special token. Therefore, no burden is placed on the user for properly using a normal token and a special token.

Displaying of the UI screen will be further described. It has been described above that the relay apparatus 100 inquires of the server 300 at least about authority based on a special token before the user selects a service on the terminal apparatus 200. A service that has been confirmed to be unusable as a result of an inquiry to the server 300 may not be accepted on the UI screen. For example, like the item 221*a* in the example illustrated in FIG. 6A, an item on the UI screen may be made not selectable. In doing so, compared with the configuration in which a service selected on the UI screen is not accepted by the relay apparatus 100, a wrong operation of selecting an unselectable service may be avoided. Furthermore, a service that has been confirmed to be unusable as a result of an inquiry to the server 300 may not be displayed as part of the list 221 on the UI screen. In other words, the list 221 displays only services usable with a normal token and a special token. In doing so, the user need not recognize whether the displayed services are selectable, and the burden on the user may be further alleviated.

It has been described above that, in the case where restrictions are individually set to authority identified by a normal token, the same restrictions are reflected in authority identified by a special token. Selection of a service unusable due to the individual restrictions on a normal token may not be accepted on the UI screen. Furthermore, services unusable due to the individual restrictions on a normal token may not be displayed as part of the list 221 on the UI screen.

The relationship of a service selected on the UI screen with a normal token and a special token is described. In the case where a selected service is a service usable with authority identified by a normal token, a normal token is selected as an access token for using the service. Therefore, in this case, an execution request for a service based on authority identified by a normal token is output from the terminal apparatus 200. In the case where a selected service is unusable with authority identified by a normal token but is usable with authority identified by a special token, a special token is selected as an access token for using the service. Therefore, in this case, an execution request for a service based on authority identified by a special token is output from the terminal apparatus 200. In the case where a service usable with both authority identified by a normal token and authority identified by a special token is selected, a normal token is selected as an access token for using the service. Therefore, in this case, an execution request for a service based on authority identified by a normal token is output from the terminal apparatus 200.

Operation of Relay Apparatus 100

Figure 7:
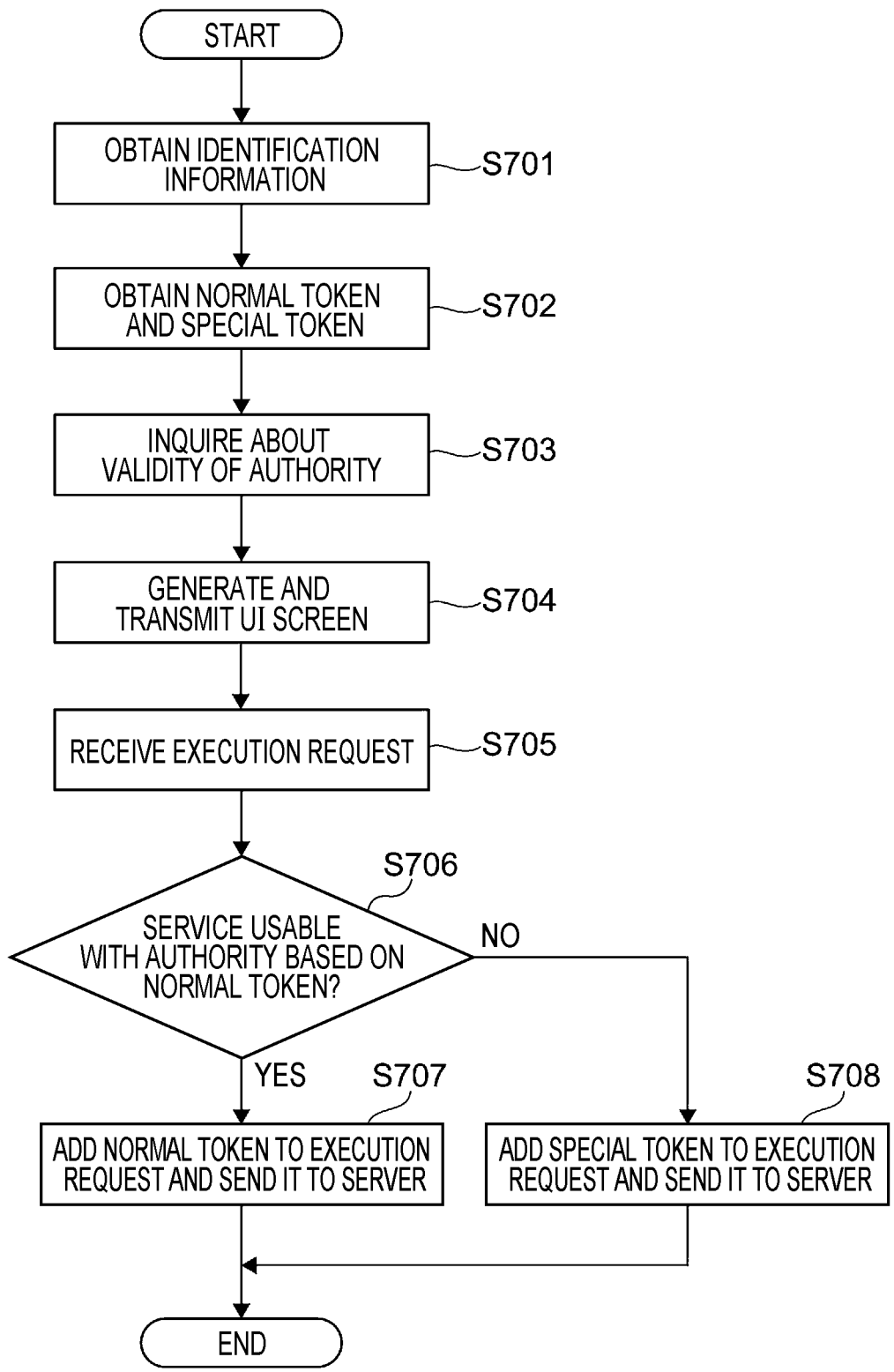
FIG. 7 is a flowchart illustrating the operation of the relay apparatus.

FIG. 7 is a flowchart illustrating the operation of the relay apparatus 100. Note that it is assumed in this exemplary operation that services usable with either authority based on a normal token or authority based on a special token are displayed on the UI screen, and selection of a service is accepted.

Obtaining identification information of a user of the terminal apparatus 200 (S701), the relay apparatus 100 obtains a normal token and a special token identified on the basis of the obtained identification information from the normal token DB 111 and the special token DB 112 (S702). The relay apparatus 100 inquires of the server 300 about the validity of authority based on the access tokens (S703).

The relay apparatus 100 generates a UI screen on the basis of a response from the server 300, and sends the UI screen to the terminal apparatus 200 (S704). The UI screen is displayed on the display device 220 of the terminal apparatus 200. On the terminal apparatus 200, the user selects a service to use on the displayed UI screen. The terminal apparatus 200 sends an execution request for using the selected service.

On receipt of the execution request from the terminal apparatus 200 (S705), the relay apparatus 100 checks whether the selected service is a service usable with authority based on a normal token. In the case where the selected service is a service usable with authority based on a normal token (YES in S706), the relay apparatus 100 adds the normal token obtained in S702 to the execution request obtained in S705, and sends the execution request with the normal token to the server 300 (S707). In contrast, in the case where the selected service is a service unusable with authority based on a normal token (NO in S706), the relay apparatus 100 adds the special token obtained in S702 to the execution request obtained in S705, and sends the execution request with the special token to the server 300 (S708).

Although the exemplary embodiment of the present disclosure has been described above, the technical scope of the present disclosure is not limited to the above-described exemplary embodiment. For example, a UI screen is generated by the relay apparatus 100, and is sent to the terminal apparatus 200 to be displayed in the above-described exemplary embodiment. In contrast, information on services displayed on a UI screen (such as the list 221 illustrated in FIGS. 6A and 6B) may be sent from the relay apparatus 100 to the terminal apparatus 200, and a UI screen may be generated by the terminal apparatus 200.

Although the range of services usable with each of a normal token and a special token is not particularly restricted in the above-described exemplary embodiment, services usable with a normal token may be restricted to the range of services usable with a special token. In addition, in the case where the validity of authority based on an issued access token (at least a special token) is secured by, for example, the specification regarding the provision of services of the server 300, confirmation of the validity of authority may not be required. In addition, various changes or replacements of configurations that do not depart from the scope of the technical idea of the present disclosure are included in the present disclosure.

In the embodiment above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising: a hardware processor configured to:
    obtain first authority information indicating possession of authority over a server, the first authority information being associated with identification information of a user, and second authority information indicating possession of authority over the server that is different from authority indicated by the first authority information, the first authority information including a first token and the second authority information including a second token, the second token having a range of authority that (a) encompasses a range of authority of the first token and (b) is wider than the range of authority of the first token, the first token being a normal token that is individually set to each user using a service of the server, and the second token being a token that is obtained by an organization and set as usable by users belonging to the organization;
    accept a request for the server;
    in a case where the request is executable with authority based on the first authority information identified by the identification information, add the first authority information to the request and send the request with the first authority information to the server;
    in a case where the request is not executable with authority based on the first authority information and is executable with authority based on the second authority information, add the second authority information to the request and send the request with the second authority information to the server; and
    inquire with the server about whether a service is usable before a user selects the service, the inquiry occurring at a same time where the first token and the second token are identified, the first token and the second token being identified when the identification information is obtained.

2. The information processing apparatus according to claim 1, wherein, in a case where the request is executable with both authority based on the first authority information and authority based on the second authority information, the hardware processor adds the first authority information to the request and sends the request with the first authority information to the server.

3. The information processing apparatus according to claim 1, wherein, in a case where a restriction is individually set to authority based on the first authority information associated with the identification information, the hardware processor does not accept a request affected by the restriction even in a case where the request is executable with authority based on the second authority information.

4. The information processing apparatus according to claim 1, wherein the hardware processor inquires of the server whether, out of the obtained first authority information and second authority information, at least the second authority information is valid for the server.

5. The information processing apparatus according to claim 4, wherein the hardware processor inquires of the server before accepting the request, and, in accordance with a result of the inquiry, does not accept the request that is not executable with authority based on the second authority information.

6. An information processing apparatus comprising:
    a hardware processor configured to:
    obtain identification information of a user;
    display, on a display device, a service usable based on first authority over a server, the first authority being associated with the identification information, and a service usable based on second authority over the server different from the first authority, the first authority represented by a first token and the second authority represented by a second token, the second token having a range of authority that (a) encompasses a range of authority of the first token and (b)

is wider than the range of authority of the first token, the first token being a normal token that is individually set to each user using a service of the server, and the second token being a token that is obtained by an organization and set as usable by users belonging to the organization;

accept an operation performed by the user to select a service;

in a case where the selected service is a service usable based on the first authority, output an execution request for the service based on the first authority; and in a case where the selected service is a service that is unusable based on the first authority and that is usable based on the second authority, output an execution request for the service based on the second authority; and inquire with the server about whether a service is usable before a user selects the service, the inquiry occurring at a same time where the first token and the second token are identified, the first token and the second token being identified when the identification information is obtained.

7. The information processing apparatus according to claim 6, wherein the hardware processor displays, on the display device, a service usable based on the first authority and a service usable based on the second authority without distinction.

8. The information processing apparatus according to claim 7, wherein, in a case where the selected service is usable based on both the first authority and the second authority, the hardware processor outputs an execution request for the service based on the first authority.

9. The information processing apparatus according to claim 7, wherein, in a case where an unusable service is individually set to the first authority associated with the identification information, the hardware processor does not accept selection of the service even in a case where the service is usable based on the second authority.

10. The information processing apparatus according to claim 9, wherein the hardware processor does not display, on the display device, an unusable service individually set to the first authority even in a case where the service is usable based on the second authority.

11. The information processing apparatus according to claim 6, wherein, when the hardware processor obtains the identification information, the hardware processor inquires of the server, regarding at least the second authority, whether each service is usable.

12. The information processing apparatus according to claim 11, wherein the hardware processor does not accept selection of an unusable service on a basis of a result of the inquiry to the server.

13. The information processing apparatus according to claim 11, wherein the hardware processor displays, on the display device, a service usable based on the first authority and a service usable based on the second authority on a basis of a result of the inquiry to the server.

14. A non-transitory computer readable medium storing a program causing a computer to execute a process, the process comprising:

accepting an input of identification information of a user;

displaying, on a display device, a service usable based on first authority over a server, the first authority being associated with the identification information, and a service usable based on second authority over the server different from the first authority, the first authority represented by a first token and the second authority represented by a second token, the second token having a range of authority that (a) encompasses a range of authority of the first token and (b) is wider than the range of authority of the first token, the first token being a normal token that is individually set to each user using a service of the server, and the second token being a token that is obtained by an organization and set as usable by users belonging to the organization;

accepting an operation performed by the user to select a service;

in a case where the selected service is a service usable based on the first authority, outputting an execution request for the service based on the first authority;

in a case where the selected service is a service that is unusable based on the first authority and that is usable based on the second authority, outputting an execution request for the service based on the second authority; and inquiring with the server about whether a service is usable before a user selects the service, the inquiry occurring at a same time where the first token and the second token are identified, the first token and the second token being identified when the identification information is obtained.

* * * * *